UNITED STATES PATENT OFFICE.

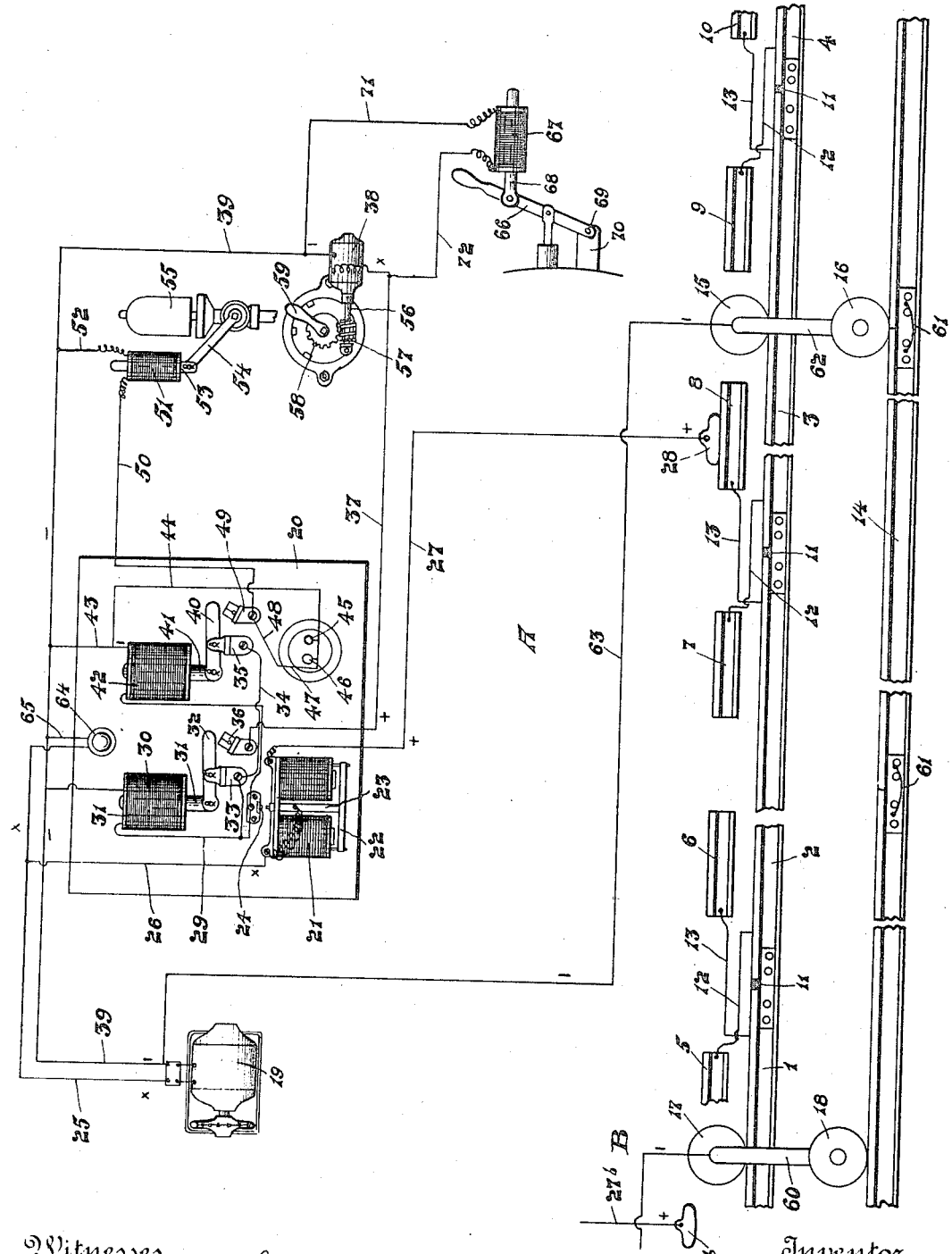

ELIAS W. CONKELL, OF BESSEMER, ALABAMA, ASSIGNOR OF NINE-TWENTIETHS TO IRA C. FASON, OF BESSEMER, ALABAMA.

ELECTRIC SIGNAL AND TRAIN CONTROL.

1,141,936.

Specification of Letters Patent.     Patented June 8, 1915.

Application filed July 10, 1914. Serial No. 850,145.

*To all whom it may concern:*

Be it known that I, ELIAS W. CONKELL, a citizen of the United States, residing at Bessemer, in the county of Jefferson and State of Alabama, have invented a new and useful Electric Signal and Train Control, of which the following is a specification.

My invention relates to improvements in electric signaling between locomotives or other vehicles upon railways and also to electric controlling of the vehicles referred to for the purpose of preventing collision between said vehicles.

The objects of the invention are to provide means for signaling between approaching vehicles upon the same track or between vehicles following each other upon the same track within predetermined distances.

A further object is to provide means for automatically controlling the air brake valve of the engine in one vehicle when it approaches another vehicle upon the same track or when one vehicle follows another within a predetermined distance.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made without departing from the spirit or sacrificing any of the advantages of the invention.

In the present invention each vehicle from which signal or control actuating currents emanate or upon which a signal and air brake valve controlling apparatus are adapted to be operated, should be provided with what will hereinafter be termed a unit, comprising an electric system consisting of means for generating current, signaling devices, and means for controlling the operation of the air brake valve.

The drawing is a diagrammatic view of a railway upon which is mounted one complete vehicle and unit, and also a fragmentary portion of a second vehicle and unit.

Similar numerals of reference indicate corresponding parts throughout the drawings.

The numerals 1, 2, 3 and 4 indicate sections of track insulated from each other and forming what is generally known as "blocks" in a railroad system. These blocks are of considerable length, extending usually for a distance of about a mile although the exact length is of no importance in this invention but will be governed by the circumstances in each particular instance. The third rail sections, 5, 6, 7, 8, 9 and 10, are preferably located beside the track and at a distance of about five hundred feet from the insulation 11 marking the termination of each "block", although these rail sections may be placed closer or farther from each other as the occasion may require. These rail sections are each connected to the track of the next adjacent "block" by means of wires 12 and 13. The other rail of the system of track is represented by the numeral 14.

The letter A represents a vehicle upon the track equipped with one of the units referred to and the letter B represents a similar vehicle, similarly equipped, the greater portion of the apparatus upon the vehicle B, being omitted. The wheels of the vehicle A are represented by the numerals 15 and 16 and the wheels of the vehicle B are represented by the numerals 17 and 18.

An electric current generator 19 is provided upon each vehicle to furnish current to the unit thereon and may be driven in any convenient and well known manner, the manner of driving the same having no bearing upon this invention. The generator 19 may be either of the direct or alternating current type, which ever is desirable or convenient to use.

A suitable support 20 is shown, upon which is mounted a part of the apparatus. An electro-magnet 21 is provided with an armature 22 having a finger 23 adapted to contact with the contact plate 24. The wire 25 leading from the generator is connected to a wire 26 which connects with the electro-magnet and a wire 27 leads from the electro-magnet to a contact shoe 28 which is adapted to contact with the third rail sections 5, 6, 7, 8, 9 and 10 when the vehicle upon which said shoe is mounted passes each of said rail sections. A similar shoe 28ᵇ is provided upon the vehicle B and connected to the unit thereon by a wire 27ᵇ. A wire 29 leads from the contact plate 24 to a solenoid 30, provided internally with an armature 31 the lower extremity of which is pivotally connected to a switch blade 32 pivoted upon a bracket 33 which is connected by a wire 34 to a similar bracket 35. The free end of the switch blade 32 is adapted to contact with a terminal 36 which is connected by a wire 37 to an electric motor 38. The wire 39 leads from the motor back to the generator 19. The bracket 35 is provided with a switch blade 40 similar to the switch blade 32 and the armature 41 of the solenoid 42 is pivotally connected to said switch blade. The solenoid 42 is connected to the wire 39 by means of a wire 43. A wire 44 is connected to the wire 43 and leads to a low voltage lamp 45 which is connected in multiple to a high voltage lamp 46, both of said lamps being preferably located behind a red bull's eye 47 as shown in the drawing. A wire 48 passes from the high voltage lamp 46 to the terminal 49 with which the switch blade 40 is adapted to contact. A wire 50 leads from the terminal 49 to the solenoid 51 which is connected by means of a wire 52 with the wire 39 which leads back to the generator. The internal armature 53 of the solenoid 51 is pivotally connected to a lever 54 which controls the signal whistle 55 in the locomotive cab. The shaft 56 of the motor 38 is provided with a worm 57 which engages a worm wheel 58 upon the air brake valve handle 59.

As long as but one vehicle, provided with a unit such as has been described, is mounted upon the track the circuit through the apparatus of the unit will at no time be closed because of the fact that the third rail sections are normally insulated from the track rails. Suppose however that a second vehicle, such as B, is located upon the same track as A and within the "block" 2, and that said vehicle B is traveling ahead of the vehicle A and in the same direction as the vehicle A. In this case current from the generator 19 in the vehicle A will pass from the contact shoe 28, through the third rail 8 and wire 13 into the track rail of the "block" 2, and then through the wheel 17 and axle 60 and wheel 18 of the vehicle B into the track rails 14. As the rails 14 are all connected by means of the electric bonds 61 the current will flow through said rails 14 and into the wheel 16 of the vehicle A and through the axle 62 to the wire 63 and back to the generator 19 in the vehicle A thus completing the circuit through the apparatus of the unit in the vehicle A. It is not necessary that a vehicle such as B, provided with a unit such as described, be within the "block" 2, in order to close the circuit in the unit upon the vehicle A. Any kind of a vehicle located upon the track within the "block" 2 would produce the same result, as all that is necessary is that a connection be made between the rail 2 and the rail 14 in order to close the circuit through the apparatus carried upon the vehicle A. Presuming now that some such vehicle is within the block 2 when the vehicle A reaches the position shown on the drawing, the circuit will be closed as before described. The armature 22 of the electromagnet 21 will be actuated, the finger 23 upon said armature contacting with the contact plate 24 thus closing the circuit to the solenoids 30 and 42. As the armature 31 of the solenoid 30 is actuated the switch blade 32 will be brought into contact with the terminal 36 thus completing the circuit to the motor 38. As the motor is started the worm 57 upon the shaft of the motor will rotate the worm gear 58 upon the air brake valve 59, thus applying air brakes. As the armature 41 within the solenoid 42 is actuated it will operate the switch blade 40 bringing said switch blade into contact with the terminal 49, completing the circuit to the solenoid 51 and to the light within the bull's eye 47. The armature 53 of the solenoid 51 will be actuated rocking the lever 54 which controls the whistle 55 thus blowing the whistle and warning the engineer of the vehicle B of the location of the vehicle A. At the same time the low voltage light 45 within the bull's eye 47 will light, apprising the engineer upon the vehicle A that the block 2 is occupied by another vehicle. The bull's eye is provided with both a low voltage lamp and a high voltage lamp to assure a light within the bull's eye at all times when the circuit is closed. Ordinarily the low voltage lamp will be the only one which would light when the circuit is closed but in case the low voltage lamp burns out the high voltage lamp will light when the circuit is closed. In the event that the vehicle B is traveling within the "block" 2 toward the vehicle A, the vehicle A will come to a stop upon reaching the third rail 8 as described and the vehicle B will continue until the shoe 28[b] contacts with the third rail 7, where the circuit through the apparatus in the vehicle B will be closed in the same manner as has been described with reference to the vehicle A.

A cab lamp 64 is shown connected to the wire 25 and to the wire 39 by means of the short wire 65. This lamp will burn continuously and is in no way connected with the apparatus described in this invention being only used as a pilot light so that the engineer will know at all times that the signal apparatus is in working order.

The engine throttle 66 is controlled by means of a solenoid 67, the armature 68 of which is pivotally connected to the handle of the throttle as shown, the lower extremity of the throttle being pivotally connected at 69 to a suitable handle 70. The solenoid is connected to the main circuit at any suitable point by means of wires 71 and 72. Thus when the circuit through the unit in the vehicle A is closed operating the audible and visible signals and the air brake the throttle will also be operated shutting off the engine.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claim.

I claim;

In an apparatus of the character described, a main circuit, means carried by the train for automatically closing said main circuit, a generator in said circuit, an electro-magnet in said main circuit adapted to be energized when said circuit is closed, a contact plate adapted to be engaged by the armature of said electro-magnet when said electro-magnet is energized, an air brake control switch solenoid electrically connected to said contact plate, an air brake controlling switch blade adapted to be operated by the armature of said solenoid, an electrical connection between said blade and one side of said generator, a terminal adapted to be engaged by said switch blade, an air brake controller motor electrically connected to said terminal, an electrical connection from said motor to the other side of said generator, a throttle controlling solenoid electrically connected to said terminal, an electrical connection leading from said solenoid back to said other side of the generator, a signal switch solenoid electrically connected to said contact plate, a signal switch adapted to be operated by the armature of said signal switch solenoid, an electrical connection between said signal switch and said air brake controller switch, a second terminal adapted to be engaged by said second switch, signal lamps, a wire leading from said second mentioned terminal and connected to said signal lamps and leading back to said other side of the generator, a whistle controlling solenoid, a wire leading from said second mentioned terminal to said whistle controlling solenoid and a wire from said whistle controlling solenoid to said other side of the generator.

In testimony that I claim the above, I have hereunto subscribed my name in the presence of two witnesses.

ELIAS W. CONKELL.

Witnesses:
F. W. BOND,
JOHN H. BISHOP.